United States Patent [19]

Chen, Sr. et al.

[11] Patent Number: 4,963,434
[45] Date of Patent: Oct. 16, 1990

[54] COMPOSITES OF AROMATIC POLYBENZIMIDAZOLES AND POLYARYLATES

[75] Inventors: Paul N. Chen, Sr., Gillette; Paul J. Harget, West Milford; Thomas J. Dolce, Stirling, all of N.J.

[73] Assignee: Hoechst Celanese Corp., Somerville, N.J.

[21] Appl. No.: 229,040

[22] Filed: Aug. 3, 1988

[51] Int. Cl.$^5$ .................... D02G 3/00; B32B 9/00; B32B 27/06
[52] U.S. Cl. .................... 428/378; 428/480; 428/483; 428/412; 428/367; 525/425; 427/372.2; 427/388.1; 427/409; 427/412.5
[58] Field of Search .................... 428/480, 483, 378; 525/425

[56] References Cited

U.S. PATENT DOCUMENTS

| | | | |
|---|---|---|---|
| 4,284,549 | 8/1981 | Salee | 524/264 |
| 4,643,937 | 2/1987 | Dickinson et al. | 428/480 |

*Primary Examiner*—P. C. Sluby
*Attorney, Agent, or Firm*—Kenneth E. Macklin

[57] ABSTRACT

A composite comprising a polyarylate or an aromatic polybenzimidazole article and a coating on at least one surface of the article comprised of a blend of from about 5 to about 95 weight percent of a polyarylate and from about 95 to about 5 weight percent of an aromatic polybenzimidazole. A process for preparing the composites comprises dissolving in a mutual solvent from about 5 to about 95 weight percent of the aromatic polybenzimidazole to about 95 to about 5 weight percent of the polyarylate, based on the total weight of those polymers, heating a polyarylate or aromatic polybenzimidazole article to a surface temperature over 100° C., e.g., from about 120° C., to about 180° C., and then coating the polyarylate or aromatic polybenzimidazole article with the solution and subsequently evaporating the solvent, thereby producing a dried coating of a blend of a polyarylate and an aromatic polybenzimidazole on at least one surface of the article. The composites, particularly in the form of films, fibers or fibrets, may be post-treated with heat or sulfuric acid in order to minimize their shrinkage when subsequently subjected to heat and in order to increase their resistance to solvents and acid.

26 Claims, No Drawings

COMPOSITES OF AROMATIC POLYBENZIMIDAZOLES AND POLYARYLATES

This invention is concerned with a novel composite comprising a polyarylate or aromatic polybenzimidazole article and a coating on at least one surface of the article of a blend of a polyarylate and an aromatic polybenzimidazole.

BACKGROUND OF THE INVENTION

The number of known classes of high performance polymers that are useful under severe environmental conditions is limited. In addition, some of the known classes of polymers are deficient in some properties, e.g., physical properties, solvent and thermal resistance, and processability. Some are also quite expensive.

PRIOR ART

Polyarylates, or aromatic polyesters, are the condensation products of aromatic dicarboxylic acids and aromatic diols and are characterized as generally having high glass transition temperatures and high heat distortion temperatures.

Representative publications which discuss wholly aromatic polyesters include: (a) "Polyesters of Hydroxybenzoic Acids," by Russell Gilkey and John R. Caldwell, *J. of Applied Polymer Sci.*, Vol. II, Pages 198 to 202 (1959); (b) "Polyarylates (Polyesters From Aromatic Dicarboxylic Acids and Bisphenols)," by G. Bier, *Polymer*, Vol. 15, Pages 527 to 535 (Aug. 1974); (c) "Aromatic Polyester Plastics," by S. G. Cottis, *Modern Plastics*, Pages 62 to 63 (Jul. 1975); and (d) "Poly(p-Oxybenzoyl Systems): Homopolymer for Coatings: Copolymers for Compression and Injection Molding," by Roger S. Storm and Steve G. Cottis, *Coatings Plast. Preprint*, Vol. 34, No. 1, Pages 194 to 197 (Apr., 1974). See also, U.S. Pat. Nos. 3,039,994; 3,169,121; 3,321,437; 3,553,167; 3,637,595; 3,651,014; 3,723,388; 3,759,870; 3,767,621; 3,787,370; 3,790,528; 3,829,406; and 3,890,256, as well as U.S. patent application Ser. No. 686,191, filed May 13, 1976, and U.S. patent application Ser. No. 686,189, filed May 13, 1976, which are herein incorporated by reference.

Additional polyarylates are described in U.S. Pat. Nos. 3,038,364 (Apr. 3, 1962); 3,216,970 (Nov. 9, 1965); 3,230,195 (Jan. 18, 1966); 3,297,633 (Jan. 10, 1967); 3,297,636 (Jan. 10, 1967); 3,317,464 (May 2, 1967); 3,351,611 (Nov. 7, 1967); 3,351,624 (Nov. 7, 1967); 3,398,20 (Aug. 20, 1968); 3,448,077 (Jun. 3, 1969); 3,449,295 (Jun. 10, 1969); 3,471,441 (Oct. 7, 1969); 3,498,950 (Mar. 3, 1970); 3,505,289 (Apr. 7, 1970); 4,049,629 (Sept. 20, 1977); 4,051,106 (Sept. 27, 1977); 4,051,107 (Sept. 27, 1977); 4,079,034 (Mar. 14, 1978); 4,126,602 (Nov. 21, 1978); 4,137,278 (Jan. 30, 1979); 4,187,259 (Feb. 5, 1980); 4,211,687 (Jul. 8, 1980); 4,221,694 (Sept. 9, 1980); 4,251,429 (Feb. 17, 1981); 4,255,555 (Mar. 10, 1981); 4,256,625 (Mar. 17, 1981); 4,278,785 (Jul. 14, 1981); 4,283,523 (Aug. 11, 1981); 4,284,549 (Aug. 18, 1981); 4,304,709 (Dec. 8, 1981); 4,305,862 (Dec. 15, 1981); 4,312,975 (Jan. 26, 1982); 4,319,017 (Mar. 9, 1982); and 4,327,012 (Apr. 27, 1982).

The polyarylates are a series of engineering thermoplastics. One class of polyarylates is available from Hoechst Celanese Corporation under the tradename of Durel ® and from Amoco Corporation under the tradename of Ardel ®. Information about the Durel ® and Ardel ® polyarylates is available from the respective manufacturers. For relatively inexpensive polymers, they have reasonably good physical properties (e.g., thermal resistance, impact strength, etc.) and good processability. They have generally good resistance to chemicals with the exception of chlorinated solvents, ethylene glycol antifreeze, brake fluid, and N,N-dimethylformamide, and inorganic acids (e.g., HCl), among others. Therefore, the utility of the polyarylates is severely limited in the aerospace industry, where resistance to paint strippers such as methylene chloride is required. Their poor hydrolytic stability also limits the use of the polyarylates in specific applications.

Aromatic polybenzimidazoles are characterized by a high degree of thermal and chemical stability. They may be shaped to form fibers, films, and other articles of wide utility which show resistance to degradation by heat, hydrolytic media and oxidizing media. However, many of the polybenzimidazoles are not easily thermally processable at desirably low enough temperatures and pressures. Unfortunately, the aromatic polybenzimidazoles have relatively high moisture regain, which, although desirable for textile fibers, is undesirable for engineering plastics. In addition, they are rather expensive polymers.

Processes for the preparation of aromatic polybenzimidazoles are described in a number of U.S. Pat. Nos., e.g., 3,901,855; 4,002,679; 3,433,772; 3,441,640; 3,509,108; 3,526,693; 3,549,603; 3,552,389; 3,619,453; 3,671,491; 3,969,430; and 4,020,142. In addition, a review of the processes for the preparation of aromatic polybenzimidazoles is contained in J. P. Critchley, G. J. Knight and W. W. Wright, *Heat-Resistant Polymers-Technologically Useful Materials*, Plenum Press, New York (1983), 259–322.

Unduly broad but unenabling suggestions about blending polymers exist in the literature. However, most pairs of polymers tend to be totally immiscible [Fred W. Billmeyer, Jr., *Textbook of Polymer Science*, Wiley-Interscience, New York (1984), 176]. The surprisingly miscible compositions of polyarylates and aromatic polybenzimidazoles are the subject of commonly assigned U.S. patent application Ser. No. 089,650, filed Aug. 26, 1987.

SUMMARY OF THE INVENTION

Briefly, the invention comprises a composite comprising a polyarylate or aromatic polybenzimibazole article and a coating on at least one surface of the article of a blend of from about 5 to about 95 weight percent of a polyarylate and from about 95 to about 5 weight percent of an aromatic polybenzimidazole, total weight percent of the two component polymers in the coating equaling 100. A process for preparing the composites comprises dissolving in a mutual solvent from about 5 to about 95 weight percent of the aromatic polybenzimidazole to about 95 to about 5 weight percent of the polyarylate, total weight percent of the two polymers being 100, heating a polyarylate or aromatic polybenzimidazole article to a surface temperature above 100° C., preferably from about 120° C. to about 180° C., and then using the solution to coat at least one surface of the polyarylate or aromatic polybenzimidazole article and subsequently drying the coating, thereby producing a dried coating of a blend of a polyarylate and an aromatic polybenzimidazole on at least one surface of the article.

The articles may be in the form of films, fibers, fibrets or molded articles. Articles may be molded from a molding composition which includes, as one component, one of the polymers in the blend of the present invention. Such a molding composition may also incorporate into the polymer matrix approximately 1 to 50 weight percent, preferably approximately 10 to 30 weight percent, based upon the total weight of the molding composition, of a solid filler and/or reinforcing agent. Representative fibers which may serve as reinforcing media include glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, etc. Representative filler materials include calcium silicate, silica, clays, talc, mica, polytetrafluoroethylene, graphite, alumina trihydrate, sodium aluminum carbonate, barium ferrite, etc.

The coated surfaces of the composites of the invention, particularly in the form of films, fibers or fibrets, may be post-treated with heat or sulfuric acid in order to minimize their shrinkage when subsequently subjected to heat and in order to increase their stabilities to solvents and acid.

Although aromatic polybenzimidazoles generally have high thermal stability and good solvent resistance, they are expensive polymers with high moisture regain. Polyarylates generally have relatively low glass transition temperatures and lack resistance to certain solvents, but they are tractable polymers and are much less expensive than aromatic polybenzimidazoles.

The novel composites of this invention have unexpected properties and benefits. The composites are useful under severe environmental conditions. Compared to polyarylate articles, the coated surfaces of the composites made from polyarylate articles have good thermal resistance, solvent resistance (e.g., to methylene chloride and tetrahydrofuran), improved abrasion resistance, and good price/performance characteristics. Compared to polybenzimidazole articles, the coated surfaces of the composites made from polybenzimidazole articles have lower moisture regain, lower cost and better adhesion to other thermoplastic polymers such as polyethylene terephthalate, polybutylene terephthalate, and polycarbonates.

Therefore, it is an object of this invention to provide composites comprising polyarylate articles with coatings on at least one surface of the article of a blend of an aromatic polybenzimidazole and a polyarylate, which composites are less expensive than aromatic polybenzimidazoles, the coated surfaces of the articles having higher thermal stability and better hydrolytic stability to acids and bases and better solvent and abrasion resistance than uncoated polyarylates. Consequently, the composites have better price/performance characteristics.

It is a further object of this invention to provide composites comprising polybenzimidazole articles with coatings on at least one surface of the articles of a blend of an aromatic polybenzimidazole and a polyarylate, the coated surfaces of the articles having lower moisture regain and better adhesion to other thermoplastic polymers such as polyesters and polycarbonates than uncoated polybenzimidazoles. Consequently, those composites have better price/performance characteristics.

It is a still further object of this invention to provide composites of aromatic polybenzimidazoles and polyarylates which are useful in applications where the polyarylates or aromatic polybenzimidazoles themselves are either not useful or not as useful.

DESCRIPTION OF THE PREFERRED EMBODIMENTS

The invention comprises a composite comprising a polyarylate or aromatic polybenzimidazole article and a coating on at least one surface of the article of a blend of from about 5 to about 95 weight percent of a polyarylate and from about 95 to about 5 weight percent of an aromatic polybenzimidazole, total weight percent of the two component polymers in the coating being 100.

The polyarylate or aromatic polybenzimidazole article may be in any form, e.g., film, fiber, fibret, or molded article. The article may be reinforced, e.g., graphite fiber coated with aromatic polybenzimidazole to form a "prepreg" tape. Such a prepreg tape may then be coated with a polyarylate/polybenzimidazole coating to form a composite of the invention that has better adhesion to other thermoplastic polymers such as polyethylene terephthalate, polybutylene terephthalate and polycarbonates.

A process for preparing the composites comprises dissolving an aromatic polybenzimidazole and a polyarylate in a mutual solvent from about 5 to about 95 of the aromatic polybenzimidazole to about 95 to about 5 of the polyarylate, based on the total weight of the two polymers, heating a polyarylate or aromatic polybenzimidazole article to a surface temperature over 100° C. and below the glass transition temperature of the polyarylate, e.g., from about 120° C. to about 180° C., and then coating at least one surface of the polyarylate or aromatic polybenzimidazole article with the solution and subsequently drying the coating, thereby producing a dried coating of a blend of a polyarylate and an aromatic polybenzimidazole on at least one surface of the article.

In order to prepare the coating solution for preparing the novel composites of the invention, the aromatic polybenzimidazoles and polyarylates may be first dissolved in a mutual solvent, e.g., N,N-dimethylformamide (DMF), N,N-dimethylacetamide (DMAc), dimethylsulfoxide (DMSO), or N,N-methylpyrrolidinone (NMP), so that each polymer is present in the resulting solution at the desired concentration up to a total polymer concentration of, e.g., from about 1% to about 25% on a weight/volume basis, preferably from about 15 to 20%. The preferred solvents are DMAc and NMP. It is preferred that the total concentration of the two polymers in the solution be such that the viscosity of the solution is acceptable for subsequent coating on the polyarylate or polybenzimidazole article. The two polymers may be simultaneously dissolved in the solvent, or each polymer may be separately dissolved in separate volumes of solvent and desired portions of the resulting solutions can be mixed together to form a solution of the two polymers.

Preferably, there is in the coating solution of the two polymers enough of the polymer of the kind comprising the article to be coated so that it can bond to the surface of the article and enough of the other kind of polymer so that it can provide the desired surface effects to the coating. The concentration of the polymers in the solution depends on whether a clear coating is desired. If so, the concentration of the polymers in the solution should be increased to at least the minimum that is empirically determined to yield clear coatings on the article. Preferably, the coating solution is not so dilute that it causes undesirable opacity of the surface of the article that it is to be used to coat. For practical purposes, the solution should not be so concentrated that the polymers precipitate from it or that it is not readily useful for coating because it has too high a viscosity. Generally, the total concentration of the two polymers in the solution is less than about 30 weight percent. Preferably, the total weight of the two polymers in the solution ranges from about 10 to about 25 weight/volume percent, more preferably from about 15 to about 20 weight/volume percent.

In order obtain a transparent coating, we found the total polymer concentration of the coating solution has to be high (e.g., about $\geq 15\%$) and the surface of the coated article has to be hot (e.g., about 150° C.) (see Table 1 below). It is believed that the coating becomes a continuous part of the article and hence exhibits permanent adhesion and interaction with the article on a molecular scale.

For the coating process, one may use any convenient means, e.g., knife, dip, or spray coating, or coextrusion while preparing the article to be coated, e.g., through an annular die.

After the solution of the two polymers is coated on the polyarylate or aromatic polybenzimidazole article, the solvent should be evaporated at low relative humidity, e.g., in a vacuum oven at moderate temperatures, e.g., at about $\geq 140°$ C., purged with dry nitrogen. Moisture should be initially excluded until most of the solvent is removed.

The two components of the coating compositions are miscible, or compatible. Several criteria indicate blend compatibility or miscibility. They are:

(a) Clearness of a film cast from an NMP solution of the two component polymers (clearness being determined by visual inspection aided by microscopic examination, if necessary);

(b) Thermal Gravimetric Analysis indicates that the blend of the two polymers follows the rule of mixtures;

(c) Residual NMP in the film follows the rule of mixtures;

(d) Fourier Transform Infrared analysis indicates intermolecular hydrogen-bonding between the polymers; and (e) X-Ray Diffraction analysis confirms that polybenzimidazole and polyarylate interact and are compatible on a molecular scale.

Although not wishing to be bound by any particular theory, we believe that when coated on a polyarylate or polybenzimidazole article, the component polymer in the coating solution which is the same kind as the article tends to migrate to the surface of the article, and the other component polymer in the coating solution tends to migrate to the surface of the coating. Therefore, we believe that a gradient composite is formed. For example, a composite of the invention made from a polyarylate article is believed to have a coating having relatively greater concentration of polyarylate close to the article and relatively greater concentration of polybenzimidazole toward the surface of the coating. A composite of the invention made from a polybenzimidazole article is believed to have a coating having a relatively greater concentration of polybenzimidazole close to the article and relatively greater concentration of polyarylate toward the surface of the coating.

The coatings of the novel composites comprise from about 5 weight percent to about 95 weight percent of a polyarylate and from about 95 weight percent to about 5 weight percent of an aromatic polybenzimidazole, total weight percent of the two polymers in the coatings equaling 100. Generally, the more preferred coatings are those which are comprised of about 20 to about 50 weight percent of either the aromatic polybenzimidazole or the polyarylate.

If a coating of the invention is mostly comprised of aromatic polybenzimidazole, it is preferred that the minor amount of polyarylate in the coating be sufficient to make the aromatic polybenzimidazole less susceptible to moisture regain. More preferably, the coatings are comprised of from about 50 weight percent to about 95 weight percent of an aromatic polybenzimidazole and from about 50 weight percent to about 5 weight percent of a polyarylate. Most preferably, the coating comprises at least about 10 weight percent of a polyarylate. It is surprising that a minor amount of the polyarylate can ameliorate the weak properties of the polybenzimidazole, e.g., moisture regain. At the same time the less expensive polyarylate decreases the cost of the coating substantially below the cost of the polybenzimidazole.

If a coating of the novel composites of the invention is mostly comprised of polyarylate, it is preferred that the minor amount of aromatic polybenzimidazole in the coating be sufficient to render the polyarylate less sensitive to solvents, particularly chlorinated hydrocarbons. Preferably, the aromatic polybenzimidazole is present in an amount sufficient to result in a composite with greatly reduced solubility and low swelling, i.e., minimal weight loss in the composite of the invention when its coated surface is contacted with a chlorinated hydrocarbon for a period of time which would ordinarily result in the dissolving of a similar object made from the polyarylate itself. More preferably, the coatings are comprised of from about 50 weight percent to about 95 weight percent of a polyarylate and from about 50 weight percent to about 5 weight percent of an aromatic polybenzimidazole. Most preferably, based on preliminary tests, the coating should contain at least about 20 to about 40 weight percent of a polybenzimidazole in order to impart to the polyarylate article greatly enhanced solvent-resistance in chlorinated solvents. In addition to improving solvent resistance, aromatic polybenzimidazole in the coating substantially increases the thermal stability and physical properties of the composite, giving excellent price-performance results. At the current time, aromatic polybenzimidazoles are on the order of twenty to forty times the price of polyarylates. Polyarylates are commercially successful because of their generally good combination of properties, with the exception, of course, of poor resistance to chlorinated solvents in some applications. Those properties can be substantially improved in accordance with this invention by coating a polyarylate article with a minor amount of a relatively more expensive aromatic polybenzimidazole in a miscible blend with the polyarylate. It appears that all the beneficial properties of the polyarylates may be retained and solvent resistance, thermal and physical properties may be improved at a moderate additional cost. It is surprising that a minor amount of the polybenzimidazole can ameliorate the relatively weak properties of the polyarylate, i.e., poor resistance to chlorinated solvents and poor surface resistance to flame or heat. At the same time, the less expensive polyarylate decreases the cost of the composite substantially below the cost of the polybenzimidazole.

For an aromatic polybenzimidazole article, it is preferred that the polyarylate be present in the coating in an amount sufficient to make the coated surfaces of the aromatic polybenzimidazole article less susceptible to moisture regain and to impart better adhesion to other thermoplastic polymers. More preferably, such coatings are comprised of from about 40 weight percent to about 95 weight percent of a polyarylate and from about 60 weight percent to about 5 weight percent of an aromatic polybenzimidazole. Most preferably, such coatings are comprised of at least about 50 weight percent of a polyarylate.

For a polyarylate article, it is preferred that the aromatic polybenzimidazole be present in the coating in an amount sufficient to render the coated surfaces of the polyarylate article less sensitive to solvents, and to increase the thermal stability of the polyarylate article's coated surface. Preferably, the aromatic polybenzimidazole is present in such coatings in an amount sufficient to result in a composite with greatly enhanced solvent resistance. More preferably, such coatings are comprised of from about 40 weight percent to about 95 weight percent of a polybenzimidazole and from about 60 weight percent to about 5 weight percent of a polyarylate. Most preferably, such coatings should contain at least about 50 weight percent of a polybenzimidazole in order to render the polyarylate component much more resistant to solvents at room temperature. In addition to improving solvent resistance, greater amounts of aromatic polybenzimidazole in the coating substantially increase the thermal and physical properties of the surface of the composite, giving excellent price-performance characteristics.

As further described below, the composites, particularly in the form of films, fibers or fibrets, may be post-treated with heat or sulfuric acid in order to minimize their shrinkage when subsequently subjected to heat and in order to increase their resistance to solvents and acid.

Although any aromatic polybenzimidazole described in the prior art may be used, the preferred aromatic polybenzimidazoles employed as starting materials to prepare the novel polymer blends of the present invention are those having the repeating unit formula:

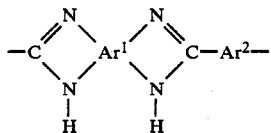

wherein >Ar¹< represents a tetravalent aromatic moiety having the formula:

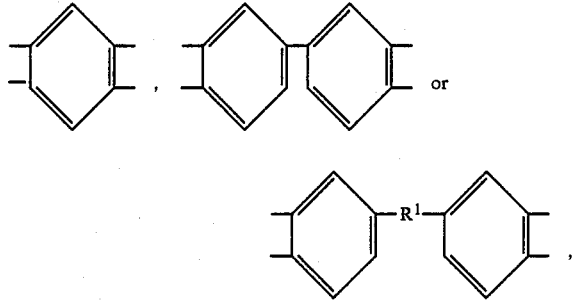

wherein R¹ is —O—, —SO₂—, —CH=CH—, —C(CF₃)₂— or (—CH₂—)$_x$ and x is an integer of from 1 to 4; and —Ar²— represents a divalent aromatic moiety having the formula:

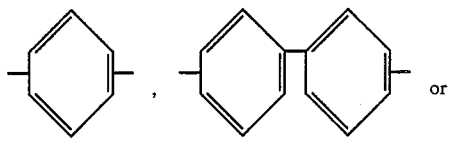

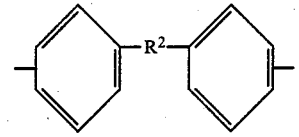

wherein R² is —O—, —SO₂—, —CH=CH—, —C(CF₃)₂— or (—CH₂—)$_x$ and x is an integer of from 1 to 4.

Examples of the more preferred aromatic polybenzimidazoles which may be used in the polymer blends of the present invention include:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene 4",4")-5,5'-bibenzimidazole;
poly-2,6'-(m-phenylene)-diimidazobenzene;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone,
poly-2,2'-(m-phenylene)-5,5'-di(benzimidazole)-methane;
poly-2,2'-(m-phenylene)-5,5'-di(benzimidazole)-hexafluoroisopropane;
poly-2,2'-(m-phenylene)-5,5"di(benzimidazole)-propane-2,2; and
poly-2,2"-(m-phenylene)-5,5"di(benzimidazole)-ethylene-1,2
where the double bonds of the ethylene groups are intact in the final polymer.

Poly-2,2'-(m-phenylene)-5,5'-bibenzimidazole, which contains recurring units of the formula:

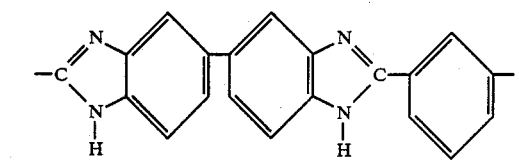

is most preferred. Aromatic polybenzimidazoles of this type are commercially available from Hoechst Celanese Corporation. These polybenzimidazoles are preferred components of the polymer blends because they are relatively more thermally stable and more soluble in N,N-dimethylacetamide than other polybenzimidazoles. This solubility makes them relatively processable.

One of the major applications for Durel ® polyarylate has been identified to be aircraft interior panels, due to Durel's low V-O flammability in a vertical burning test, low off gas from decomposition, and good mechanical properties. However, Durel sheeting does not meet the requirement for solvent resistance. Efforts aimed at improving the solvent resistance of Durel polyarylate via melt blending with PBI proved to be unsuccessful. However, Durel/PBI solution blends as either an exterior coating or as a surface laminate for the Durel ® polyarylate article produce a reasonable cost product with improved solvent resistance. Also, composites of the invention may be able to withstand vapor phase soldering for electronic applications. Ardel ® polyarylate may be substituted for Durel ® polyarylate with similar results.

Generally, the polyarylates used in the invention have the following unit formula:

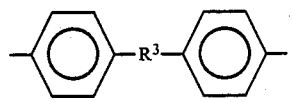

wherein $Ar^3$ represents divalent aromatic moieties having from 6 to about 18 carbon atoms, or aromatic moieties having the following formula

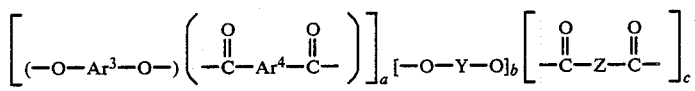

wherein $R^3$ represents —C(CH$_3$)$_2$— or —SO$_2$—, S, or —O—, or mixtures thereof; $Ar^4$ represents divalent aromatic moieties having from 6 to about 18 carbon atoms, or mixtures thereof; Y represents a divalent aliphatic moiety containing up to 6 carbon atoms, or mixtures thereof; Z represents a divalent aliphatic moiety containing up to 6 carbon atoms, or mixtures thereof; and a has a value of greater than 0.5 to 1, b has a value of 0 or a value less than 0.5, and c has a value of 0 or a value less than 0.5, the sum of a, b and c being equal to 1.

The aromatic acids which may be utilized to produce the polyarylates typically are dicarboxylic acids in which each carboxyl group is attached to a carbon atom on the same ring or in isolated or fused aromatic rings.

Representative examples of aromatic acids include terephthalic acid; isophthalic acid; diphenyl-4,4'-dicarboxylic acid; naphthalene-2,6-dicarboxylic acid; naphthalene-2,7-dicarboxylic acid; naphthalene-1,4-dicarboxylic acid; naphthalene-1,5-dicarboxylic acid; diphenylether, 4,4'-dicarboxylic acid; diphenylsulfone-4,4'-dicarboxylic acid; diphenylmethane-4,4'-dicarboxylic acid and diphenoxyethane-4,4'-dicarboxylic acid. The ester forming derivatives thereof may be used instead of the acids.

The aromatic diols which may be used to produce the aromatic polyesters typically are diols in which the hydroxy group is attached to a carbon atom in an isolated or fused aromatic ring.

Representative examples of suitable aromatic diols include hydroquinone, resorcinol, 1,4-naphthalenediol, catechol, 4,4'-isopropylidenediphenol (also known as bisphenol A) or its structure analogs, 4,4'-sulfonyldiphenol, 4,4'-thiodiphenol, 4,4'-oxydiphenol, 4,4'-dihydroxybiphenyl, 4,4'-sulfonylis(2,6-dibromophenol), 4,4'-(2-norbornylidene)diphenol, 2,6-naphthalenediol, and 4,4'-isopropylidenebis (2,6-dichlorophenol).

Such aromatic polyesters may also have incorporated therein aromatic hydroxy acids such as p-hydroxybenzoic acid, m-hydroxybenzoic acid and the various naphthalenehydroxycarboxylic acids. Although other classes of polyarylates may be used in the composites of this invention, preferred polyarylates which may be used in the composites and processes of this invention have repeating units of the following formula

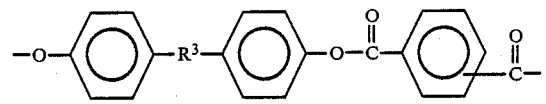

wherein $R^3$ represents —C(CH$_3$)$_2$— or —SO$_2$—, S or —O—. The phthalate moiety may be from isophthalic acid, terephthalic acid or a mixture of the two at any ratio (i.e., ranging from about 99% isophthalic acid and about 1% terephthalic acid to about 1% isophthalic acid and about 99% terephthalic acid).

The polyarylates from HOECHST CELANESE Corporation (Durel ®) and Amoco Corporation (Ardel ®) are most preferred. Durel ® polyarylate is an amorphous homopolymer with a weight average molecular weight of about 20,000 to about 200,000. Different polyarylates may be blended in the coatings of the composites of the invention.

The polyarylates are soluble in halogenated or polar solvents. For example, both the Durel ® and Ardel ® polyarylates dissolve readily in methylene chloride, chloroform, N-methylpyrrolidinone, N,N-dimethylformamide and N,N-dimethylacetamide. However, heating at about 100° C. is required for dissolving higher concentrations of polyarylate ($\geq 10\%$) in N-methylpyrrolidinone in order to obtain a clear solution.

The properties of composites of the present invention can be improved by heat treatment below the heat deflection temperature of the article for a sufficient period of time. The composites may be thermally treated in an inert atmosphere (e.g., nitrogen, argon, helium) or alternatively a flowing oxygen-containing atmosphere (e.g., air). For instance, the article may be brought to a temperature approximately 10° C. to 30° C. below the heat deflection temperature of the polyarylate, at which temperature the article remains a solid object. The heat treatment times commonly range from a few minutes to a number of days, e.g., from about 0.5 to about 200 hours, or more. Preferably, the heat treatment is conducted for a time of about 48 to about 72 hours.

Heat treatment can provide an increase in the heat deflection temperature of the composites. The heat deflection temperature is a measure of the upper temperature at which composites of the invention can be effectively used. The composites of the present invention can have heat deflection temperatures of at least approximately 180° C. for polyarylate articles and 400° C. for polybenzimidazole articles.

The composites, particularly in the form of films, fibers or fibrets, may be post-treated with heat or sulfuric acid in order to minimize their shrinkage when subsequently subjected to heat and in order to increase their resistance to solvents, such as DMAc and NMP, and acids, such as concentrated inorganic acids, e.g., hydrochloric acid. After post-treatment, the coated surfaces of the composites are no longer soluble in the solvents used to initially form the blends of the constituent polymers, e.g., DMAc or NMP. Heating in air or in an inert atmosphere at a temperature below about 180° C. for polyarylate articles and from about 200° to about 500° C. for polybenzimidazole articles for a period of time of from about 1 to about 30 minutes may be employed. The time-temperature relationship to obtain the required results can be determined empirically. Preferably, for polybenzimidazole articles heating at a temperature of from about 300° to about 350° C. may be used. Alternatively, the coated surface of the article may be post-treated by treating with a sulfonating agent followed by heat setting at a temperature of from about 150° to about 400° C. for a period of time sufficient to minimize its shrinkage when subsequently subjected to heat and to increase its resistance to solvents and acids. A solution of from about 1 to about 15% sulfonating agent followed by heat setting at a temperature of from about 150° to about 400° C. may be used. The sulfonating agent may be sulfuric acid, sulfur trioxide, toluene sulfonic acid or naphthalene sulfonic acid. Preferably, post-treatment is accomplished by dipping the coated surface of the polybenzimidazole article in 5% sulfuric acid followed by heat setting at a temperature of from about 300° to about 350° C. for a period of time sufficient to minimize its shrinkage when subsequently subjected to heat and to increase its resistance to solvents and acid.

The following examples describe the manner and process of making and using the invention and set forth the best mode contemplated by the inventors for carrying out the invention, but are not to be construed as limiting.

In the following examples, the preferred aromatic polybenzimidazole polymer is used, namely, poly-2,2'-(m-phenylene)-5,5'-bibenzimidazole.

EXAMPLE 1

Celanese as-spun polybenzimidazole fiber having an inherent viscosity of 0.7 (12.5 gm) was mixed with Durel ® polyarylate having an inherent viscosity of 0.6 (12.5 gm) in 100 mls of N-methylpyrrolidinone at 180° C. for 120 minutes. The solution contained 12.5% polybenzimidazole (PBI) and 12.5% polyarylate (PA) in N-methylpyrrolidinone (NMP). The solution was clear (no precipitate). The solids content of the solution was about 25% weight/volume. A yellow film was cast from the solution on a Durel ® polyarylate sheet (100 mils). After coating, the blend solvent was evaporated at low relative humidity in a vacuum oven at about ≧140° C. purged with dry nitrogen. A Durel/PBI composite was formed of the dried coating and the Durel sheet. Visual inspection indicated that the dried coating was clear. Adhesion of the coating to the article was determined by pressing Scotch tape against the coating and then removing the tape. None of the coating adhered to the tape that was removed. (In contrast, a similarly formed all-PBI coating on a Durel ® polyarylate sheet was stripped from the sheet when Scotch tape pressed on the PBI coating was subsequently stripped off.)

The coating of Durel polyarylate and PBI apparently became a part of the polyarylate sheet because it exhibited permanent adhesion and apparent interaction with the Durel sheet on a molecular scale. Methylene chloride dissolves Durel ® polyarylate. However, drops of methylene chloride placed on the coated surface of the composite of the invention had no effect on the surface. Compared to Durel sheet, the Durel/PBI sheet composite shows improved thermal, chemical and solvent resistances. The results are tabulated in column 1 of Table 1 below.

EXAMPLE 2

The procedure of Example 1 was repeated except that a 10% solids solution was used. The resulting coating was semitransparent. The results are tabulated in column 2 of Table 1 below.

EXAMPLE 3

The procedure of Example 1 was repeated, but the Durel ® sheet was not heated. The resulting coating was opaque. The results are tabulated in column 3 of Table 1, which follows.

TABLE 1

| DUREL/PBI COATINGS ON DUREL ® POLYARYLATE | | | |
|---|---|---|---|
| | Example 1 | Example 2 | Example 3 |
| Article | Durel Disc | Durel Disc | Durel Disc |
| | ↓ | ↓ | ↓ |
| Heated | 150° C., 10 min. | 150° C., 10 min. | No heatng |
| | ↓ | ↓ | ↓ |
| Coating | coated wth 25% solids at (50/50) | coated with 10% solids at (50/50) | coated with 25% solids at (50/50) |
| | ↓ | ↓ | ↓ |
| Results | Clear Disc | Semi-transparent Coating | Opaque coating |
| | ↓ | ↓ | ↓ |
| CH₂Cl₂ on coated surface | No Effect | No Effect | No Effect |
| | ↓ | ↓ | ↓ |
| Scotch ® Tape on Coated Surface Stripped | No Coating Removed | No Coating Removed | No Coating Removed |

In order to get a transparent coating, we found the concentration of the coating solution has to be high (e.g., about 15 to 20%) and the surface of the coated disc has to be hot (e.g., about 150° C.) (see Table 1).

EXAMPLE 4

Resistances of films of blends of Durel ® polyarylate and polybenzimidazole to methylene chloride are indicated in Table 2, which follows:

TABLE 2

| METHYLENE CHLORIDE RESISTANCE OF FILMS OF THE BLENDS Durel/PBI | | | | | |
|---|---|---|---|---|---|
| 100/0 | 80/20 | 60/40 | 40/60 | 20/80 | 0/100 |
| poor | fair | good | excel. | excel. | excel. |

*Solvent resistance was visually determined by soaking the film samples in methylene chloride at room temperature for seven days. For example, a (100/0) Durel/PBI film dissolved in methylene chloride in less than one minute.
**excel. = excellent

EXAMPLE 5

Based on the relative PBI concentration, the PBI/PA blend films exhibited excellent or improved resistance towards chlorinated hydrocarbons, but they are still soluble in polar solvents, such as NMP and DMAc. Those film samples also shrunk at an elevated temperature (e.g., >200° C.). Two post-treatment methods, thermal or sulfonation agent treatments, were developed for enhancing the solvent (NMP) stability and thermal shrinkage properties of the compatible PBI/PA blends. Initial results on an 80/20:PBI/PA film indicated the sample treated with either method (e.g., thermal treating at 380° C. for 20 minutes or 5% sulfuric acid dipping followed with 6 minutes 380° C. heat-setting) not only exhibited good physical integrity, but also showed improved solvent stability in NMP (100° C., 30 minutes) and concentrated sulfuric acid (25° C., 48 hours), a substantial improvement over the untreated films. Independent thermal analysis indicated these post-treatments would dramatically improve the thermal shrinkage properties of the original blend (see Table 3).

TABLE 3
POST-TREATMENT OF PBI/PA (80/20) FILMS

| Treatment | Thermal Shrinkage (40° to 480° C. in air) | NMP Solubility (100° C. 30 minutes) |
|---|---|---|
| Control | 6.2% | Soluble |
| Sulfuric Acid treated | 4.7% | Insoluble |
| Thermally treated | 0.2% | Insoluble |

Note:
Control samples were washed with hot water (80° C.) for 12 hours in order to remove residual NMP.

Fourier Transform Infrared (FTIR) analytical studies suggested that the sulfuric acid treatment resulted in chemical sulfonation of the aromatic structure of the polymer components. For the high temperature thermally-treated blend, FT-IR analysis indicated that the improved chemical and thermal shrinkage resistance might be resulting from complex chemical reactions. First, the intermolecular hydrogen bonding between polybenzimidazole (PBI) and polyarylate (PA) appeared to have been decreased relative to the untreated film because the carbonyl band of PA in the treated film was sharpened. Secondly, the PA and PBI might form some cross-linkages, which were difficult to detect by FT-IR, but were sufficient enough to improve the chemical and shrinkage stability of the orginal film.

EXAMPLE 6

Homogeneous and tractable NMP dopes containing up to a total 20% (wt/vol) of Durel ® polyarylate and PBI solids were successfully prepared. Based on visual inspection and haze level, the stability of these dopes appeared to increase with the increase of the relative Durel polyarylate concentration in the solution blend (see Table 4). In other words, Durel polyarylate interacted with PBI in NMP solvent; hence, the solubility and stability of PBI in the solution blend were enhanced.

TABLE 4
DUREL/PBI DOPE DEVELOPMENT

| Durel/PBI (wt./wt.) | | | | | |
|---|---|---|---|---|---|
| 100/0 | 80/20 | 60/40 | 40/60 | 20/80 | 0/100 |
| Film Stability >4 wks | >4 wks | >3 wks | >1 wk | >3 days | <3 days |

*Stability was monitored at room temperature via visual observation.
**Durel (IV 0.60), PBI (As-spun fiber).

EXAMPLE 7

Celanese as-spun polybenzimidazole fiber having an inherent viscosity of 0.7 (12.5 gm) was mixed with Durel ® polyarylate having an inherent viscosity of 0.6 (12.5 gm) in 100 mls of N-methylpyrrolidinone at 180° C. for 120 minutes. The solution contained 12.5% polybenzimidazole (PBI) and 12.5% polyarylate (PA) in N-methylpyrrolidinone (NMP). The solution was clear (no precipitate). The solids content of the solution was about 25% weight/volume. A yellow film is cast from the solution on a polybenzimidazole sheet (100 mils). After coating, the blend solvent is evaporated at low relative humidity in a vacuum oven at about ≧140° C. purged with dry nitrogen. A Durel/PBI composite is formed of the dried coating and the PBI sheet. Visual inspection indicates that the dried coating is clear.

What is claimed is:

1. A composite comprising a polyarylate or an aromatic polybenzimidazole article and a coating on at least one surface of the article of a blend of from about 5 to about 95 weight percent of an aromatic polybenzimidazole and from about 95 to about 5 weight percent of a polyarylate, total weight percent of the two component polymers in the coating equaling 100.

2. A composite as claimed in claim 1 in which the aromatic polybenzimidazole in the coating contains units of the formula:

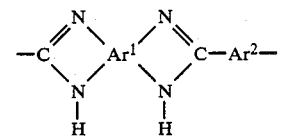

wherein >Ar¹< represents a tetravalent aromatic moiety having the formula:

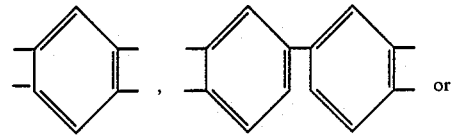

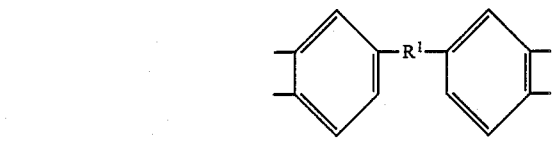

wherein R¹ is —O—, —SO₂—, —CH=CH—, —C(CF₃)₂— or (—CH₂—)$_x$ and x is an integer of from 1 to 4; and —Ar²— represents a divalent aromatic moiety having the formula:

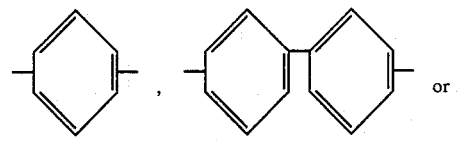

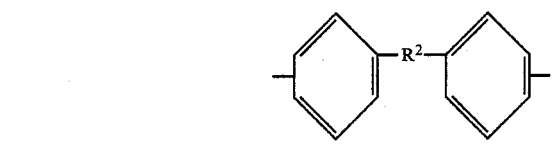

wherein R² is —O—, —SO₂—, —CH=CH—, —C(CF₃)₂— or (—CH₂—)$_x$ and x is an integer of from 1 to 4.

3. A composite as claimed in claim 1 in which the polyarylate in the coating has the following unit formula:

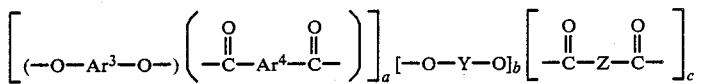

wherein Ar³ represents divalent aromatic moieties having from 6 to about 18 carbon atoms, or aromatic moieties having the following formula

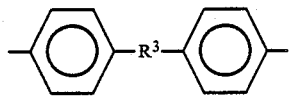

wherein R³ represents —C(CH₃)₂— or —SO₂—, S, or —O—, or mixtures thereof; Ar⁴ represents divalent aromatic moieties having from 6 to about 18 carbon atoms, or mixtures thereof; Y represents a divalent aliphatic moiety containing up to 10 carbon atoms, or mixtures thereof; Z represents a divalent aliphatic moiety containing up to 10 carbon atoms, or mixtures thereof; and a has a value of greater than 0.5 to 1, b has a value of 0 or a value less than 0.5, and c has a value of 0 or a value less than 0.5, the sum of a, b and c being equal to 1.

4. A composite as claimed in claim 1 in which the aromatic polybenzimidazole in the coating contains units of the formula:

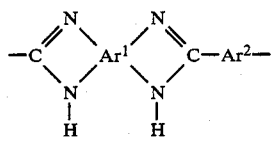

wherein >Ar¹< represents a tetravalent aromatic moiety having the formula:

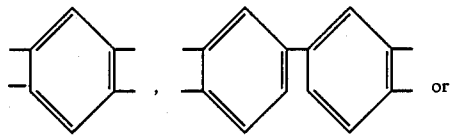

wherein R¹ is —O—, —SO₂—, —CH=CH—, —C(CF₃)₂— or (—CH₂—)ₓ and x is an integer of from 1 to 4; and —Ar²— represents a divalent aromatic moiety having the formula:

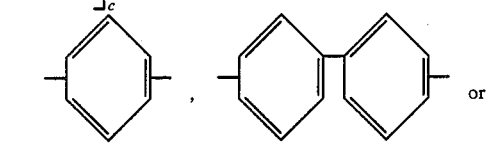

wherein R² is —O—, —SO₂—, —CH=CH—, —C(CF₃)₂— or (—CH₂—)ₓ and x is an integer of from 1 to 4; and the polyarylate in the coating has the following unit formula:

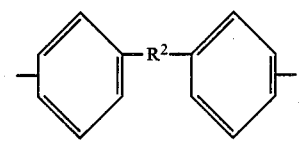

wherein Ar³ represents divalent aromatic moieties having from 6 to about 18 carbon atoms, or aromatic moieties having the following formula

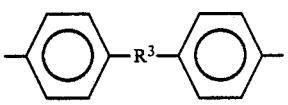

wherein R³ represents —C(CH₃)₂— or —SO₂—, S, or —O—, or mixtures thereof; Ar⁴ represents divalent aromatic moieties having from 6 to about 18 carbon atoms, or mixtures thereof; Y represents a divalent aliphatic moiety containing up to 10 carbon atoms, or mixtures thereof; Z represents a divalent aliphatic moiety containing up to 10 carbon atoms, or mixtures thereof; and a has a value of greater than 0.5 to 1, b has a value of 0 or a value less than 0.5, and c has a value of 0 or a value less than 0.5, the sum of a, b and c being equal to 1.

5. A composite as claimed 1 in which the article is comprised of an aromatic polybenzimidazole and the coating is comprised of an aromatic polybenzimidazole and a polyarylate which is present in the coating in an amount sufficient to make the aromatic polybenzimidazole article less susceptible to moisture and more compatible with thermoplastic polymers.

6. A composite as claimed in claim 1 in which the article is comprised of an aromatic polybenzimidazole and the coating on the article comprises from about 40 weight percent to about 95 weight percent of a polyarylate and from about 60 weight percent to about 5 weight percent of an aromatic polybenzimidazole.

7. A composite as claimed in claim 1 in which the article is comprised of an aromatic polybenzimidazole and the coating on the article comprises at least about 50 weight percent of a polyarylate.

8. A composite as claimed in claim 1 in which the article is comprised of a polyarylate and the coating on the article is comprised of a polyarylate and an aromatic polybenzimidazole which is present in the coating in an amount sufficient to make the surface of the polyarylate article less sensitive to solvents and also to increase the thermal stability of the surface of the polyarylate.

9. A composite as claimed in claim 1 in which the article is comprised of a polyarylate and the coating comprises at least about 25 to 30 weight percent of an aromatic polybenzimidazole.

10. A composite as claimed in claim 1 in which the article is comprised of a polyarylate and the coating comprises from about 40 weight percent to about 95 weight percent of an aromatic polybenzimidazole and from about 60 weight percent to about 5 weight percent of a polyarylate.

11. A composite as claimed in claim 1 in which the aromatic polybenzimidazole in the article and the coating thereon is poly-2,2'-(m-phenylene)-5,5'-bibenzimidazole.

12. A composite as claimed in claim 1 in which the polyarylate in the article and the coating thereon contains units of the formula

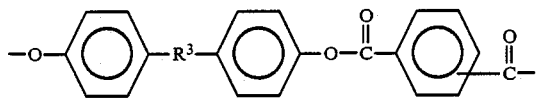

wherein $R^3$ represents —C(CH$_3$)$_2$— or —SO$_2$—, —S— or —O— and the phthalate moiety may be from isophthalic acid or terephthalic acid or a mixture of the two.

13. A composite as claimed in claim 12 in which the polyarylate contains a phthalate moiety

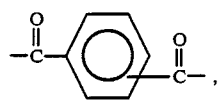

which is comprised of moieties from a mixture of isophthalic acid and terephthalic acid in a ratio ranging from 99% moieties from isophthalic acid to 1% moieties from terephthalic acid and from 1% moieties from isophthalic acid to 99% moieties from terephthalic acid.

14. A composite as claimed in claim 1 in which the article is a film, fiber or fibret.

15. A composite film, fiber or fibret as claimed in claim 14, in which the aromatic polybenzimidazole contains units of the formula:

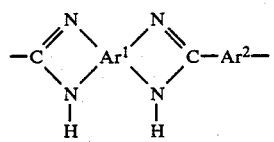

wherein $>Ar^1<$ represents a tetravalent aromatic moiety having the formula:

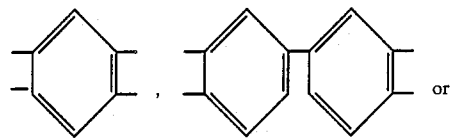

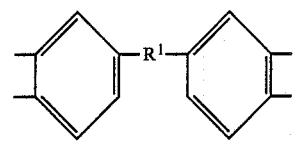

wherein $R^1$ is —O—, —SO$_2$—, —CH=CH—, —C(CF$_3$)$_2$— or (—CH$_2$—)$_x$ and x is an integer of from 1 to 4; and —Ar$^2$— represents a divalent aromatic moiety having the formula:

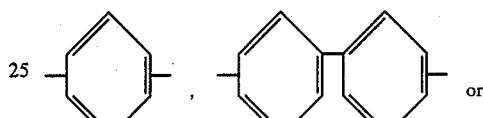

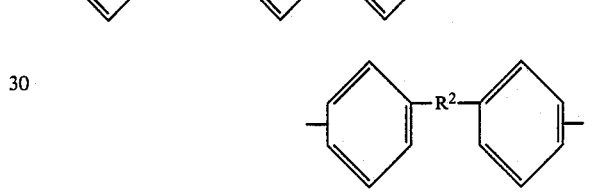

wherein $R^2$ is —O—, —SO$_2$—, —CH=CH—, —C(CF$_3$)$_2$— or (—CH$_2$—)$_x$ and x is an integer of from 1 to 4; and the polyarylate has the following unit formula:

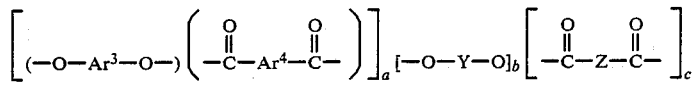

wherein Ar$^3$ represents divalent aromatic moieties having from 6 to about 18 carbon atoms, or aromatic moieties having the following formula

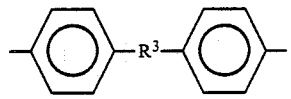

wherein $R^3$ represents —C(CH$_3$)$_2$— or —SO$_2$—, S, or —O—, or mixtures thereof; Ar$^4$ represents divalent aromatic moieties having from 6 to about 18 carbon atoms, or mixtures thereof; Y represents a divalent aliphatic moiety containing up to 10 carbon atoms, or mixtures thereof; Z represents a divalent aliphatic moiety containing up to 10 carbon atoms, or mixtures thereof; and a has a value of greater than 0.5 to 1, b has a value of 0 or a value less than 0.5, and c has a value of 0 or a value less than 0.5, the sum of a, b and c being equal to 1.

16. A composite film, fiber or fibret as claimed in claim 14 in which the film, fiber or fibret is comprised of polyarylate and there is present at least about 40 weight percent of an aromatic polybenzimidazole in the coating.

17. A composite film, fiber or fibret as claimed in claim 14 in which the film, fiber or fibret is comprised of an aromatic polybenzimidazole and there is present at least about 20 weight percent of a polyarylate in the coating.

18. A composite film, fiber or fibret as claimed in claim 14, in which the polyarylate contains units having the formula:

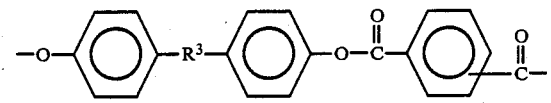

wherein R³ represents —C(CH₃)₂— or —SO₂—, —S— or —O— and the phthalate moiety may be from isophthalic acid or terephthalic acid or a mixture of the two.

19. A composite film, fiber or fibret as claimed in claim 14 in which the aromatic polybenzimidazole is poly-2,2'-(m-phenylene)-5,5'-bibenzimidazole.

20. A composite film, fiber or fibret as claimed in claim 14 which is post-treated with heat or a sulfonating agent sufficiently to minimize its shrinkage when subsequently subjected to heat and to increase its resistance to solvents and acids.

21. A composite film, fiber or fibret as claimed in claim 14 which is post-treated by heating at a temperature below its heat deflection temperature for a period of time sufficient to minimize its shrinkage when subsequently subject to heat and to increase its resistance to solvents and acids.

22. A composite film, fiber or fibret as claimed in claim 14 which is comprised of a polybenzimidazole and is post-treated by heating at a temperature of from about 300° to about 350° C. for a period of time sufficient to minimize its shrinkage when subsequently subjected to heat and to increase its resistance to solvents and acids.

23. A composite film, fiber or fibret as claimed in claim 14 which is comprised of a polyarylate and is post-treated by heating at a temperature of from about 150° to about 180° C. for a period of time sufficient to minimize its shrinkage when subsequently subjected to heat and to increase its resistance to solvents and acids.

24. A composite film, fiber or fibret as claimed in claim 14 which is post-treated by treating with a sulfonating agent followed by heat setting at temperature of from about 150° to about 400° C. for a period of time sufficient to minimize its shrinkage when subsequently subjected to heat and to increase its resistance to solvents and acids.

25. A composite film, fiber or fibret as claimed in claim 14 which is post-treated by treating with sulfuric acid, sulfur trioxide, toluene sulfonic acid or naphthalene sulfonic acid followed by heat setting at a temperature of from about 150° to about 400° C. for a period of time sufficient to minimize its shrinkage when subsequently subjected to heat and to increase its resistance to solvents and acids.

26. A composite film, fiber or fibret as claimed in claim 14 which is comprised of a polybenzimidazole article and is post-treated by dipping in 5% sulfuric acid followed by heat setting at 300° C. to 350° C. for a period of time sufficient to minimize its shrinkage when subsequently subjected to heat and to increase its resistance to solvents and acids.

* * * * *